(12) United States Patent
Beck et al.

(10) Patent No.: US 12,229,469 B2
(45) Date of Patent: Feb. 18, 2025

(54) SYSTEM INFORMATION ACCESS USING ISOLATED CABLE

(71) Applicant: Lenovo (Singapore) Pte. Ltd., Singapore (SG)

(72) Inventors: Kevin W Beck, Raleigh, NC (US); Thorsten Stremlau, Morrisville, NC (US); Robert James Norton, Jr., Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 513 days.

(21) Appl. No.: 17/701,177

(22) Filed: Mar. 22, 2022

(65) Prior Publication Data

US 2023/0305796 A1   Sep. 28, 2023

(51) Int. Cl.
  *G06F 3/147*  (2006.01)
  *H04L 9/30*  (2006.01)
(52) U.S. Cl.
  CPC ............... *G06F 3/147* (2013.01); *H04L 9/30* (2013.01)
(58) Field of Classification Search
  CPC . G06F 3/147; H04L 9/30; H04L 63/08; H04L 63/105; H04L 67/12; H04L 69/26; H04L 69/18; H04L 12/2807; H04L 12/2823; H04L 43/04; H04L 43/045; H04W 12/77
  See application file for complete search history.

(56) References Cited

U.S. PATENT DOCUMENTS

| | | | |
|---|---|---|---|
| 8,700,850 B1* | 4/2014 | Lalouette | G06F 3/0679 710/316 |
| 2016/0065542 A1* | 3/2016 | Driscoll | H04L 63/0428 713/168 |
| 2023/0222853 A1* | 7/2023 | Rich | G07C 5/008 701/29.6 |

* cited by examiner

*Primary Examiner* — Brian F Shaw
(74) *Attorney, Agent, or Firm* — FERENCE & ASSOCIATES LLC

(57) ABSTRACT

One embodiment provides a method, the method including: providing, via an execution module of a cable, an instruction to a system coupled to the cable to access and read out information of the system to the cable; generating, at the cable, a machine-readable label from the information of the system; and displaying, on a display operatively coupled to the cable, the machine-readable label, wherein the machine-readable label provides instructions to a device reading the machine-readable label to access a data storage location and log the information of the system into the data storage location.

20 Claims, 3 Drawing Sheets

SYSTEM INFORMATION ACCESS USING ISOLATED CABLE

BACKGROUND

As computing systems are utilized, they store information related to the use of the system which identifies data related to the granular use of the system, for example, battery cycles, shock events, hours run, thermal events, and the like. This information may be useful in different applications or use cases. For example, if something is not working on the system, a technician can access this information to identify if it may provide an indication of why the system is not working correctly. As another example, many entities lease systems that have a lease ending date. At this date the system is turned in and replaced with a new system for the user. However, the system may still have some life or use, identified as residual value. This residual value can be determined from the information.

BRIEF SUMMARY

In summary, one aspect provides a method, the method including: providing, via an execution module of a cable, an instruction to a system coupled to the cable to access and read out information of the system to the cable; generating, at the cable, a machine-readable label from the information of the system; and displaying, on a display operatively coupled to the cable, the machine-readable label, wherein the machine-readable label provides instructions to a device reading the machine-readable label to access a data storage location and log the information of the system into the data storage location.

Another aspect provides a cable, the cable including: a display operatively coupled to the cable; an execution module operatively coupled to the display, the execution module including a processor and a memory device that stores instructions that, when executed by the processor, causes the device to: provide, via the execution module, an instruction to a system coupled to the cable to access and read out information of the system to the cable; generate, at the cable, a machine-readable label from the information of the system; and display, on the display, the machine-readable label, wherein the machine-readable label provides instructions to a device reading the machine-readable label to access a data storage location and log the information of the system into the data storage location.

A further aspect provides a product, the product including: a computer-readable storage device that stores executable code that, when executed by a processor, causes the product to: provide, via an execution module of a cable, an instruction to a system coupled to the cable to access and read out information of the system to the cable; generate, at the cable, a machine-readable label from the information of the system; and display, on a display operatively coupled to the cable, the machine-readable label, wherein the machine-readable label provides instructions to a device reading the machine-readable label to access a data storage location and log the information of the system into the data storage location.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
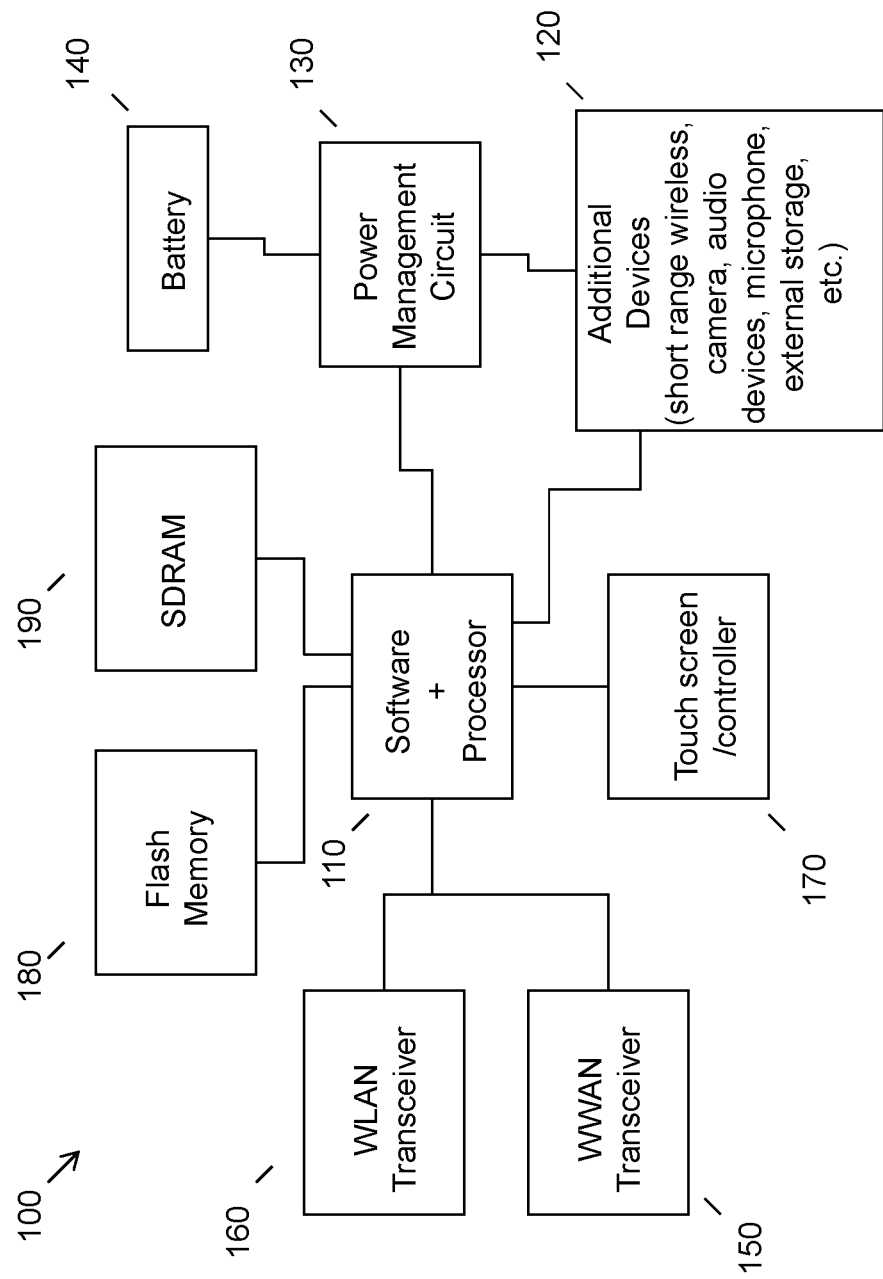
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

To access the information regarding the system, a technician has to power on the system, access the proper display screens that display the desired information, and log the information. This is very time-consuming and requires precision by the technician. Thus, this process can lead to human error where information is incorrectly logged. Incorrectly logged information can lead to incorrect residual value calculations. Thus, this process is both inefficient and frequently inaccurate. There are also in-band management tools that work when the system is actively deployed and managed by a tool. The tool can keep track of this information while the system is deployed and running. However, when the system is wiped for return and/or resale, this information can only be gathered using the manual technique described above or booting via a network boot program.

While there are techniques for transmitting system information from a cellular phone to a data storage location, these techniques transmit all the information of the mobile device to the data storage location. This transmitted information may unintentionally include malware or other nefarious software or code. In other words, if the mobile device is infected with nefarious software, this software will also be transmitted to the data storage location, thereby infecting the data storage location. Purposely including nefarious software on a mobile device to be transmitted to a data storage location, is one technique that nefarious actors may use to access and infect the data storage location. Additionally, these techniques are only applicable to mobile devices and are not found for more standard computing systems (e.g., laptops, personal computers, etc.).

Accordingly, the described system and method provides a technique for accessing information on a system utilizing a cable that sends an instruction to read out the information, generate a machine-readable label from the information, and display the machine-readable label on a display so that a device reading the label can log the information into a data storage location. The described system includes a cable that has an execution module and an operatively coupled display. The cable is plugged into a system for which system information is desired. The execution module provides an instruction to the system to access and read out information of the system to the cable. In other words, the execution module of the cable provides instructions to pull the desired system information from the system without requiring a user to manually access the system and identify the locations of the desired system information.

From the information, the system generates a machine-readable label which can be displayed on the display of the cable. When the machine-readable label is read by another device, it provides instructions to access a data storage location and log the information of the system into the data storage location, thereby negating the need for a user to manually log the system information. In an embodiment, the cable does not include any external communication connection capabilities, meaning it cannot transmit information to any other location, thereby isolating the cable from any other system. Another benefit that the described cable may provide is that it may be encrypted and only allow communication with a system that is able to be authenticated through the encryption. Thus, the described cable provides a secure technique for accessing and logging the system information.

Therefore, a system provides a technical improvement over traditional methods for accessing system information. The described system and method provide both a device and a technique for accessing system information that does not require a user to completely boot up the system in order to access the system information. Additionally, since the device and technique work to access system information after the system has been wiped, the device and technique provide an improvement over conventional system tools that track the information when the system is in-band. The device and technique are able to be employed while the system is powered down and the device itself provides the instructions for powering on the system and accessing the appropriate locations for the system information and then generating a machine-readable label from the information. A secondary device can then be used to read the label and transmit the information to a data storage location. Thus, not only is the described system and method much quicker than manual access-and-log techniques, but, because it is isolated, it also eliminates the ability of malware or other nefarious software to infect the logging system. Accordingly, the described system and method is more efficient, more accurate, and more secure than conventional techniques for acquiring and logging system information.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
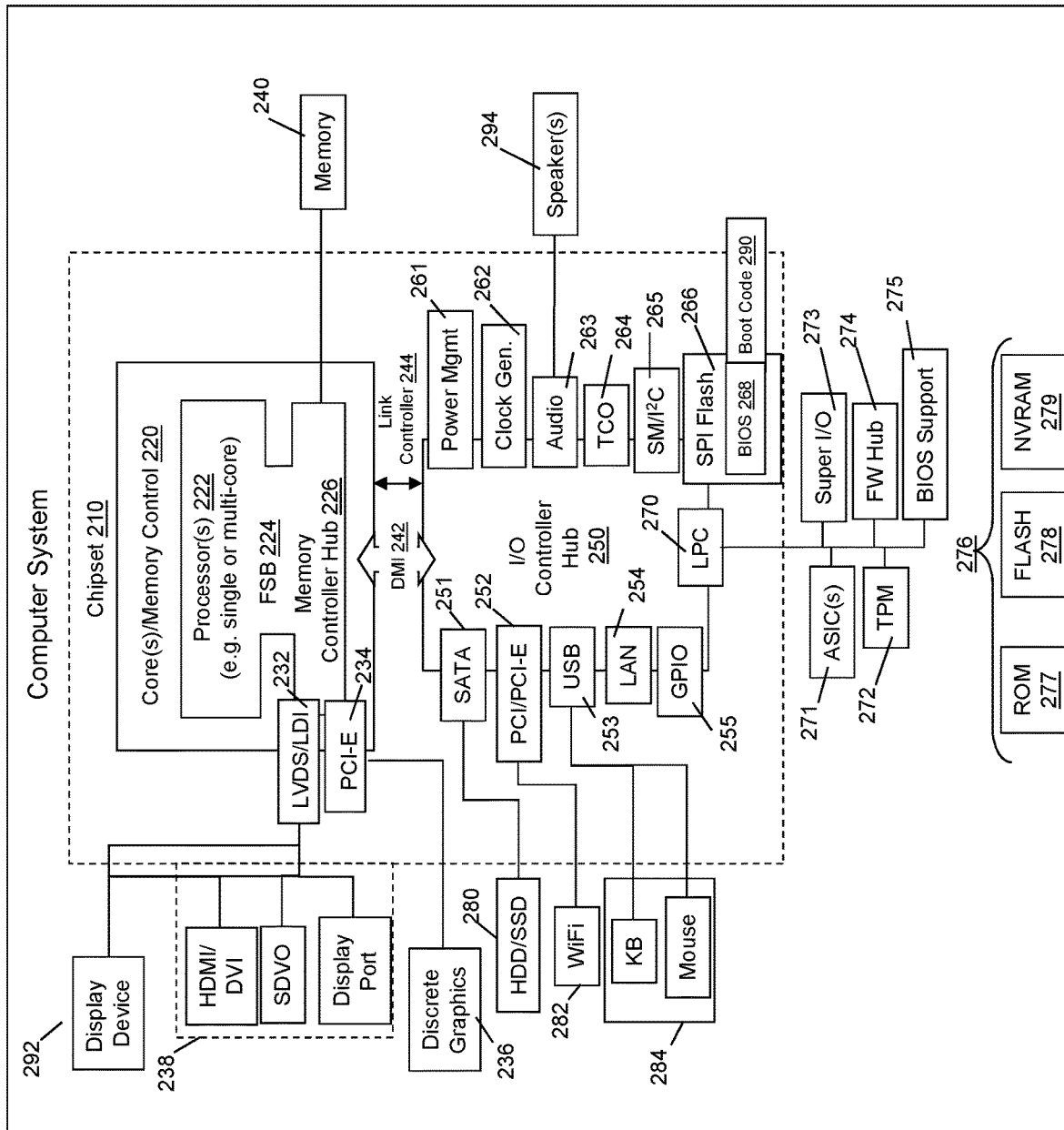
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in systems that are used in logging system information and/or programming the execution module for the described cable. For example, the circuitry outlined in FIG. 1 may be implemented in a tablet or smart phone embodiment, whereas the circuitry outlined in FIG. 2 may be implemented in a personal computer embodiment.

Figure 3:
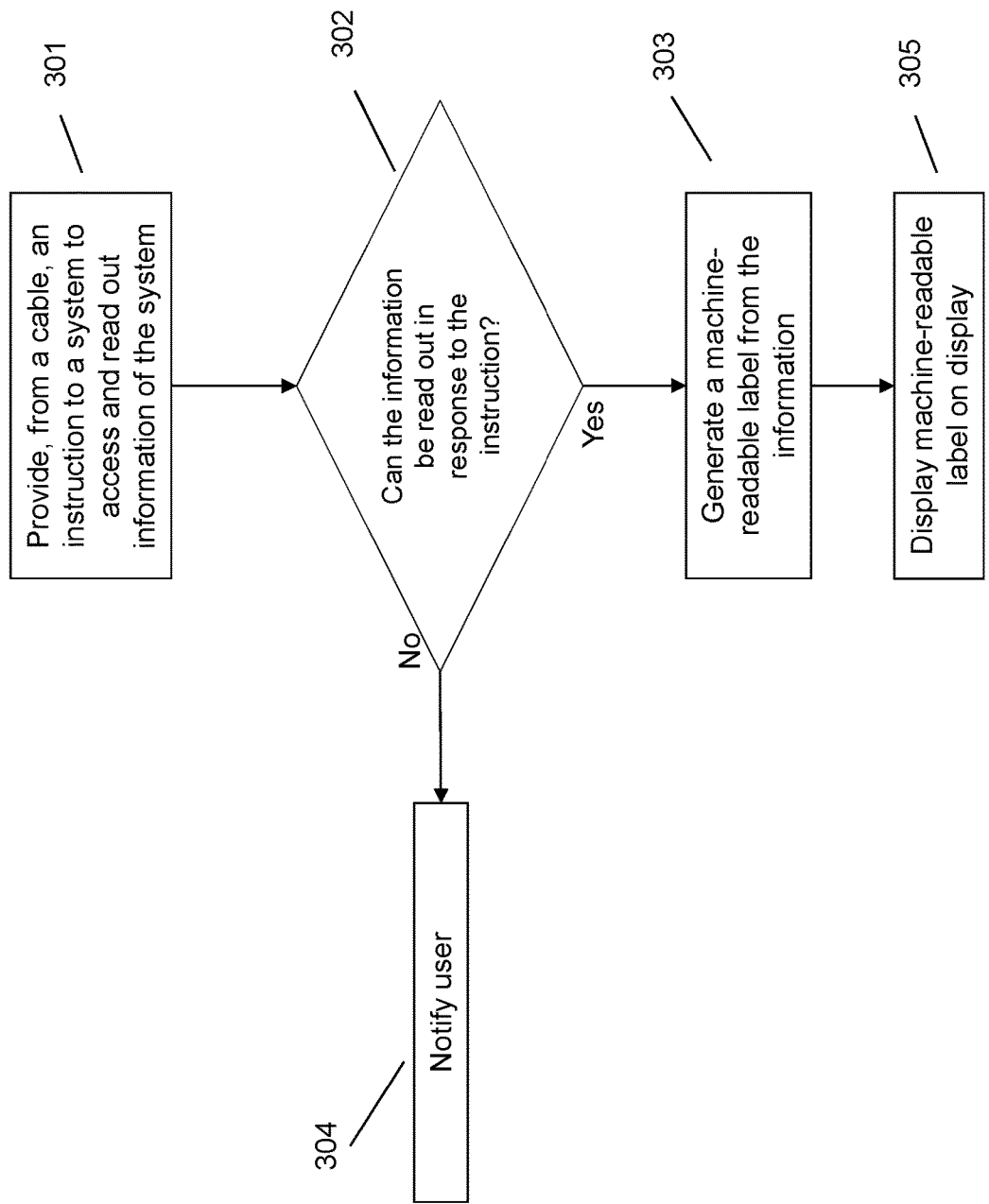
FIG. 3 illustrates an example method for accessing information on a system utilizing a cable that sends an instruction to read out the information, generate a machine-readable label from the information, and display the machine-readable label on a display so that a device reading the label can log the information into a data storage location.

FIG. 3 illustrates an example method for accessing information on a system utilizing a cable that sends an instruction to read out the information, generate a machine-readable label from the information, and display the machine-readable label on a display so that a device reading the label can log the information into a data storage location. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to log system information. Additionally, the described cable includes features that are unique to the described system.

The described system and method may be employed on a uniquely designed cable that has unique features and attributes. The cable may be a single data and power cable (e.g., a USB-C cable, USB-mini cable, micro-USB cable, or any other data/power cable), a cable having separate power and data cables, and/or the like. The cable type may be dependent on the use case where the cable will be applied. For example, newer systems may be able to use combined data/power cables, whereas older systems may only be able to use separate data and power cables. Similarly, the connector type may also be dependent on the use case or application.

The cable includes a display that is operatively coupled to the cable. While the disclosure discusses the fact that the cable can be isolated from external systems with no external communication connections capabilities, there may be uses where external communication connections may be useful. Thus, the cable may be designed to have external communication connections, for example, near-field communication connections, wireless communication connections, wired communication connections, and/or the like. In the case that the cable does have external communication connections, the display may be a display that is not mechanically coupled to the cable, and is instead in operative communication with the cable via the one or more external communication connections.

In the event that the cable is isolated, meaning it is not designed with external communication connections, the display is mechanically coupled to the cable. The display may be integral to the cable or may be otherwise attached to the cable and utilize a data and/or power line from the cable to display data on the display and also power the display, if needed. Example displays, whether integral, mechanically coupled, or external displays, include e-ink displays or other reflective displays, liquid crystal displays (LCD) or other emissive displays, monitors, light emitting diode (LED) displays, and/or the like.

The cable also includes an execution module which includes a processor and a memory device storing code that is executable by the processor. It should be noted that the memory device may not be a separate component and may, rather, be a part of the execution module. In other words, the execution module may include memory and may not include a separate memory "device". However, this configuration still remains in the spirit of this disclosure and the term "memory device" as claimed and as further described herein. The execution module may be programmed with code to perform the functions and provide the instructions as described further herein.

At 301, the execution module of the cable may provide an instruction to a system coupled to the cable to access and read out information of the system to the cable. In an example use case, the cable may be plugged into a port of a system, also referred to as a target system for ease of readability. The target system may be a system which a user wants to log system information from. Unlike conventional systems, the described system and technique does not require the target system to be powered on and booted into any particular system, for example, the basic input/output system (BIOS) where most, if not all, the desired system information would be stored. Thus, when the cable is plugged into the target system, the cable provides enough power to the system to access the BIOS, or other system of the target system that would store the desired system information. Accordingly, the power provided may only be enough to power the system processor so the BIOS could be accessed and would not power any peripherals, for example, display, keyboard, mouse, any other connection ports, and/or the like.

Once the appropriate system is powered on, which will be described as the BIOS for ease of readability but is not intended to limit the scope of the disclosure to only the BIOS, the execution module may transmit the instruction to access the desired system level information. Which information is accessed may be based upon the use case, but may include information such as asset or system information (e.g., make, model, serial number, installed components, etc.), any custom changes to the system, whether the hard-drive, solid-state drive, or other storage drive has been cleaned or formatted (referred to as wiped), a number of hours that the system has run (referred to as an odometer reading), whether any shock events have occurred as detected by an accelerometer chip, a number of battery cycles, anomalous thermal events, and/or the like. The instruction may also identify the specific location that the desired information may be stored so that it can be accurately captured. Accordingly, the execution module may need to be uniquely programmed for a single system or class of systems. However, again, this will be dependent on the application and information that is being requested.

To ensure that system information is not inappropriately read or provided to just any user with the cable, the cable and system may require authentication before instructions are sent from the cable to the target system. Thus, the cable may include encryption that can be used to authenticate the cable and target system so that communication can occur therebetween. Example encryption may include a key pair, where the cable has a private key and public key and the system also has a private key and public key. In standard key encryption techniques, the public key is known and is used to encrypt the transmitted encryption message. The encrypted message can then be decrypted using the private key of the receiving entity (i.e., the entity receiving the encrypted message or responding to the authentication protocol). The decrypted message is then encrypted using the public key and sent back to the transmitter (i.e., the entity sending the original message or initiating the authentication protocol). The transmitter decrypts the re-encrypted message using its private key and compares it to the original message to perform the authentication. Upon successful authentication of the key pair, communication between the cable and target system can occur.

There are many different authentication and encryption techniques that can be utilized and that vary in security and speed of authenticating communication. Additionally, some authentication techniques rely on having access to external communication channels. Thus, it should be understood that different encryption and authentication techniques can be utilized and that the chosen one will be dependent on the use case, desired level of security, and whether the cable has external communication channel access.

Once the instruction is sent from the execution module to the target system, the cable or system may determine if the system level information can be read out in response to the instruction at 302. This determination may simply be based upon whether the cable receives data from the target system in response to the provided instruction. If no information is received at 302, the system may notify a user at 304. Since the cable may not have external communication connections, the notification may be displayed on the display of the cable, for example, in the form of an error message, error code, or other message indicating no information was received. Information may also be not received if the instruction transmission is unsuccessful, the cable is unable to power the appropriate system, the cable is incorrectly connected to the target system, the connection port is disabled or has failed, or the like. Thus, the error message may also include an explanation of why information was not received. This explanation may be in the form of an error code that has a corresponding cause that is known to the user or may be looked-up in a manual or other literature provided with the cable.

If, on the other hand, information is received from the target system at 302, the system and/or cable may generate a machine-readable label from the information of the system. The machine-readable label may include any type of optical or visual label that can encode information, for example, a quick response (QR) code, barcode, information label, or the like. Thus, the cable can encode the system information into the machine-readable label that can be read by another device. Since the system information is encoded into a machine-readable label, it can be read by another device to quickly retrieve the information, but ensures that the cable itself is not transmitting information which prevents any malicious or nefarious code from being transmitted and infecting another system. In other words, generation of the machine-readable label provides a mechanism to allow the cable to be isolated while still obtaining the desired system information and being able to convey the information.

At 305, the cable may display the machine-readable label on the display. The machine-readable label provides instructions to a device reading the machine-readable label to access a data storage location and log the information of the system into the data storage location. In other words, when a second device is used to scan or read the machine-readable label, the second device executes instructions, which are encoded within the label, that causes the device to access a data storage location and log the system information encoded within the label into the data storage location. This may include reading and storing the system information on the second device and then transmitting the system information to the data storage location.

As an additional, or alternative, level of encryption to the cable and target system encryption and authentication, the machine-readable label may also be encrypted. This may only allow specific devices to read the label and access the instructions contained within the label. The device may be authenticated using the authentication instructions within the machine-readable label. Upon authentication, the device can then access the data storage location at least enough to log the information encoded within the label. Additionally, or alternatively and depending on the level of security desired, any device may be used to read the label, but the device is only used as a transmission device based upon the instructions in the label. Thus, the device itself never has access to or stores the system information, thereby preventing users from accessing the information unless they have access to the data storage location containing the logged information.

It should be noted that in order to make the system more secure and prevent transmission of malicious or nefarious code from the cable to the target system via the cable, the data transmission may be only one way from the target system to the cable. In other words, the only transmission that occurs from the cable to the target system is the transmission of the executable instructions. No data is transmitted from the cable to the target system. Rather, the only data transmitted is from the target system to the cable. This ensures that the system is not infected with malicious or nefarious code from the cable. Additionally, since the cable is isolated, if malicious or nefarious code has infected the target system, the only impacted component is the cable which cannot transmit the malicious or nefarious code to any other system.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:
providing, via an execution module of a cable, an instruction to a system coupled to the cable to access and read out information of the system to the cable;
generating, at the cable, a machine-readable label from the information of the system; and
displaying, on a display operatively coupled to the cable, the machine-readable label, wherein the machine-readable label provides instructions to a device reading the machine-readable label to access a data storage location and log the information of the system into the data storage location.

2. The method of claim 1, wherein the cable does not have any external communication connection capabilities.

3. The method of claim 1, wherein data transmission between the cable and the system only occurs from the system to the cable.

4. The method of claim 1, wherein, upon connection of the cable to the system, the system is powered on.

5. The method of claim 1, wherein accessing the information of the system comprises accessing a basic input/output system and accessing system level information.

6. The method of claim 1, comprising, prior to the providing an instruction, authenticating the cable with the system.

7. The method of claim 6, wherein the authenticating comprises exchanging a private and public key pair between the cable and the system.

8. The method of claim 1, wherein the machine-readable label is encrypted and wherein the device reading the machine-readable label is authenticated based upon the encryption and accesses the data storage location upon successful authentication.

9. The method of claim 1, wherein the display comprises an e-ink display.

10. The method of claim 1, wherein the cable comprises a power and data cable.

11. A cable, the cable comprising:
a display operatively coupled to the cable;
an execution module operatively coupled to the display, the execution module comprising a processor and a memory device that stores instructions that, when executed by the processor, causes the device to:
provide, via the execution module, an instruction to a system coupled to the cable to access and read out information of the system to the cable;
generate, at the cable, a machine-readable label from the information of the system; and
display, on the display, the machine-readable label, wherein the machine-readable label provides instructions to a device reading the machine-readable label to access a data storage location and log the information of the system into the data storage location.

12. The cable of claim 11, wherein the cable does not have any external communication connection capabilities.

13. The cable of claim 11, wherein data transmission between the cable and the system only occurs from the system to the cable.

14. The cable of claim 11, wherein, upon connection of the cable to the system, the system is powered on.

15. The cable of claim 11, wherein accessing the information of the system comprises accessing a basic input/output system and accessing system level information.

16. The cable of claim 11, comprising, prior to the providing an instruction, authenticating the cable with the system.

17. The cable of claim 16, wherein the authenticating comprises exchanging a private and public key pair between the cable and the system.

18. The cable of claim 11, wherein the machine-readable label is encrypted and wherein the device reading the machine-readable label is authenticated based upon the encryption and accesses the data storage location upon successful authentication.

19. The cable of claim 11, wherein the cable comprises a power and data cable.

20. A product, the product comprising:
a computer-readable storage device that stores executable code that, when executed by a processor, causes the product to:
provide, via an execution module of a cable, an instruction to a system coupled to the cable to access and read out information of the system to the cable;
generate, at the cable, a machine-readable label from the information of the system; and
display, on a display operatively coupled to the cable, the machine-readable label, wherein the machine-readable label provides instructions to a device reading the machine-readable label to access a data storage location and log the information of the system into the data storage location.

* * * * *